United States Patent [19]

Szayer et al.

[11] Patent Number: 4,990,042
[45] Date of Patent: Feb. 5, 1991

[54] SELF-DRILLING BLIND SETTING RIVET

[76] Inventors: Geza J. Szayer, 24771 Acropolis Dr.; Stig V. Naona, 23572 Valarta La. both of, Mission Viejo, Calif. 92691

[21] Appl. No.: 402,765

[22] Filed: Sep. 5, 1989

[51] Int. Cl.$^5$ ............................................ F16B 13/04
[52] U.S. Cl. ...................................... 411/29; 411/43; 10/27 R
[58] Field of Search ................. 411/29, 39, 43, 45, 411/55, 69, 70, 387; 10/27 R

[56] References Cited

U.S. PATENT DOCUMENTS

| | | |
|---|---|---|
| 3,403,593 | 10/1968 | Moore . |
| 3,437,004 | 4/1969 | Pacharis . |
| 3,453,927 | 7/1969 | Moore . |
| 3,750,518 | 8/1973 | Rayburn ............................ 411/29 |
| 3,935,786 | 2/1976 | Murray et al. .................... 411/29 |
| 3,982,464 | 9/1976 | Sygnator ........................... 411/387 |
| 4,629,380 | 12/1986 | Gunkel et al. ..................... 411/29 |

FOREIGN PATENT DOCUMENTS 2113791 8/1983 United Kingdom ................. 411/43

Primary Examiner—Neill R. Wilson
Attorney, Agent, or Firm—Henry M. Bissell

[57] ABSTRACT

A blind setting rivet which may be used to secure two layers of materials together is disclosed which drills and deburrs its own aperture through the two layers of materials and attaches the materials together in a secure, water-resistant, sealed manner. The rivet includes deburring ears to remove any burrs from the drilling operation, thus ensuring that the rivet head will fit in a flat manner on the outside surface of the materials to be secured. The shaft used to set the rivet has a plurality of spiral flutes located around the circumference thereof, which spiral flutes ensure the application of a uniform amount of force to set the rivet prior to fracture of the shaft.

19 Claims, 2 Drawing Sheets

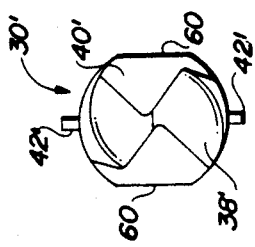
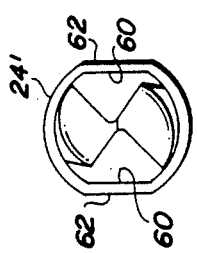
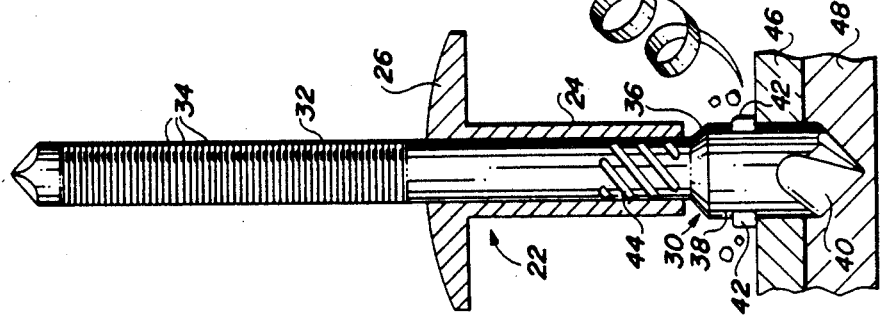
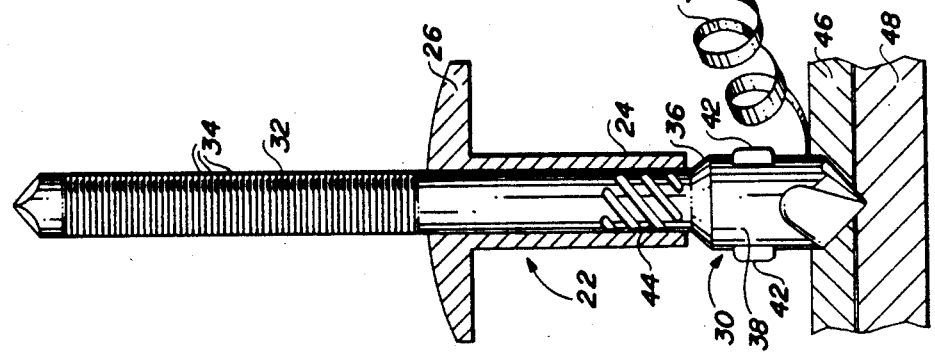
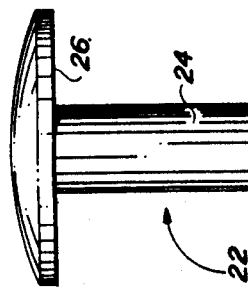
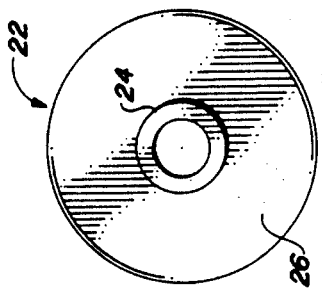
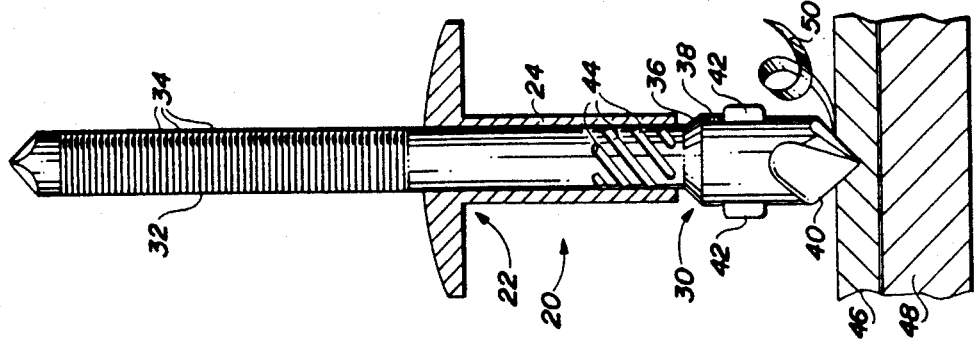

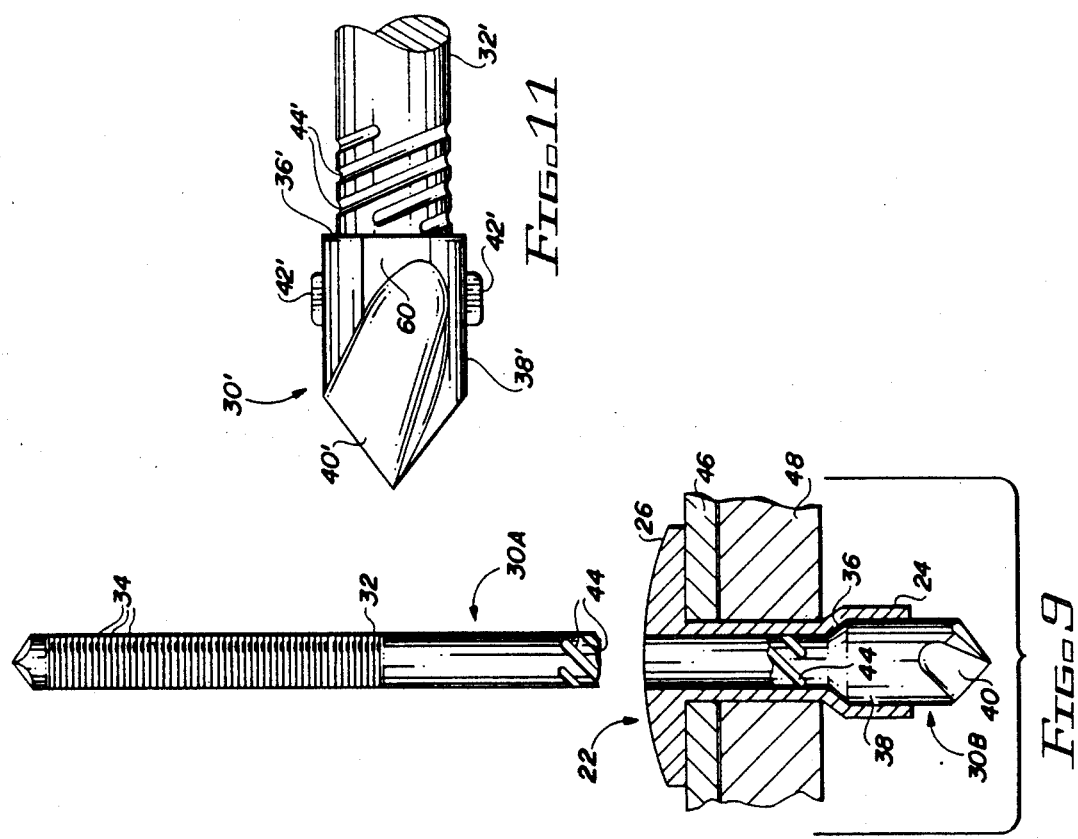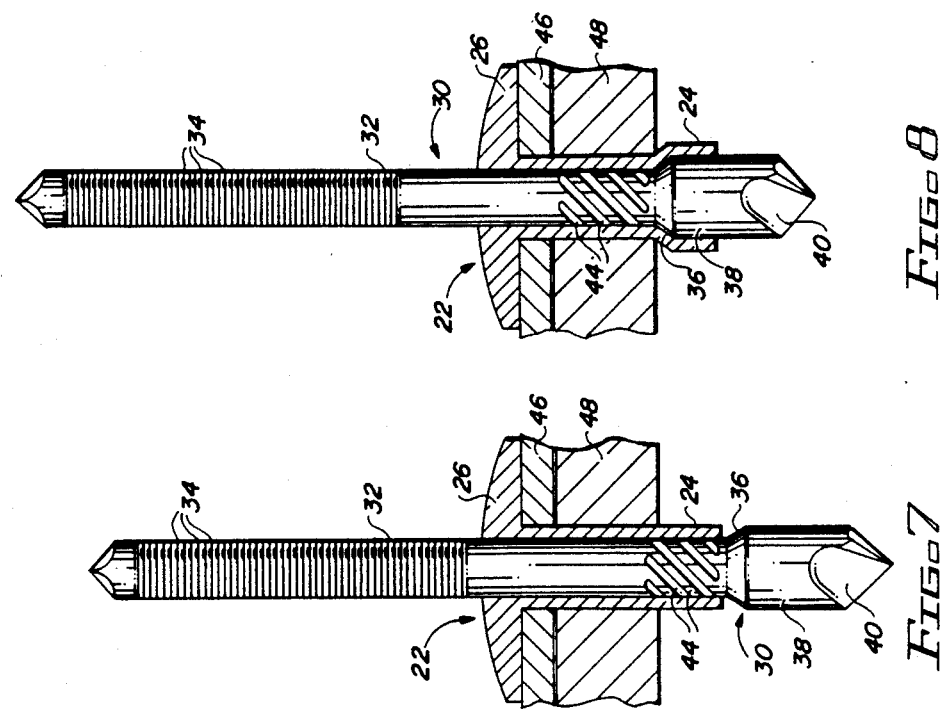

SELF-DRILLING BLIND SETTING RIVET

BACKGROUND OF THE INVENTION

1. Field of the Invention

The present invention relates generally to blind rivets which may be used to secure two layers of material together with access from one side only, and more particularly to an improved blind rivet which drills and deburrs its own aperture through the two layers of materials and attaches the materials together in a secure, water-resistant, sealed manner.

2. Description of the Related Art

Rivets have been used as fastening members for many years, beginning with the use of hot rivets which were inserted through an aperture after heating and peened. More recently, blind rivets have been used to secure two layers of materials together while requiring access from one side only. Blind rivets are inserted into an aperture from the front side thereof, and fastened from the front side by using one of at least two techniques.

The older technique is to use a threaded means to deform the side of the rivet which has been inserted into an aperture. By turning a driving member, the inner end of the rivet is pulled toward the outside, deforming the rivet to retain it in place. Such a rivet is illustrated in U.S. Pat. No. 3,403,593, and in U.S. Pat. No. 3,453,927, both to Moore. The Moore rivets are typical of this type of blind rivet.

The newer and preferred technique is that of the so-called "pop" rivet in which a shaft extends through a hollow cylindrical rivet sleeve having an enlarged head thereon. The rivet sleeve is typically made of a material such as aluminum. A mandrel is located on the end of the shaft which is on the blind end of the rivet, adjacent the blind end of the rivet sleeve. The rivet is inserted into a pre-drilled aperture, and the shaft is placed under tension from the front of the joint to draw the mandrel against the rivet sleeve and toward the head of the rivet sleeve, radially expanding the portion of the rivet sleeve in the back of the joint.

The shaft is scored near the end attached to the mandrel, and upon the exertion of sufficient tensile force, the shaft will break off at the scored location after the rivet is set. Such blind rivets of the "pop" rivet variety are widely used today in a broad number of applications. Such blind rivets have the advantage of being easy to use, and also provide a relatively great strength-to-weight characteristic.

One of the few disadvantages such blind rivets have is that an aperture must be pre-drilled through the materials prior to the time the rivet is used. As might be expected, the art is replete with a number of proposed solutions to this problem in the form of self-drilling rivets. The Moore references mentioned above are examples of such rivets, with a drill tip being mounted on the blind end of the Moore rivets.

The Moore rivets offer several particular disadvantages which make them less than completely satisfactory. First, the Moore rivets are the type which has a threaded shaft requiring a number of rotations to set the rivet, making the installation require considerably more effort than a "pop" rivet. Secondly, the Moore rivets are difficult to manufacture, since the drill tip must be welded onto the threaded shaft. In addition, the Moore rivets will often leave a burr on the outside layer of materials drilled, which burr will prevent the head of the rivet from seating properly on the outer layer. Finally, and most significantly, the Moore rivets are expensive to manufacture, and due to this high cost are economically undesirable in most applications.

U.S. Pat. No. 3,750,518, to Rayburn, discloses a self-drilling rivet which sets in the manner of "pop" rivets by exerting a tension on a shaft. The Rayburn rivet also has the disadvantage of leaving a burr on the outer layer of material as it drills through the two layers of material to be fastened. Again, the presence of this burr may prevent the Rayburn rivet from seating properly on the outer layer of material, thus causing a weak joint. In addition, the Rayburn rivet does not provide a secure seal, since the drill head may fall off or be pushed through the remainder of the rivet. Thus, the Rayburn rivet relies entirely on the hollow rivet sleeve to form the finished rivet.

U.S. Pat. No. 3,935,786, to Murray et al., discloses another self-drilling rivet having the same disadvantages of the Rayburn rivet. The Murray et al. rivet is susceptible to leaving a burr on the outer layer of materials which may prevent the head of the rivet from being properly seated. The Murray et al. rivet, like the Rayburn rivet, does not provide a good seal since the drill head of the Murray et al. rivet is susceptible to dropping off. Finally, the Murray et al. rivet relies entirely on the hollow rivet sleeve to form the finished rivet.

Another self-drilling rivet is disclosed in U.S. Pat. No. 4,629,380, to Gunkel et al. The Gunkel et al. rivet, like all the self-drilling rivets discussed above, will likely leave a burr on the outside of the outer layer of material when the aperture is drilled for the rivet. The head of the rivet will be seated over this burr, preventing the head of the rivet from properly engaging in a flat manner the outside of the outer layer of material.

In addition, the Gunkel et al. rivet, like the other rivets above, uses a shaft which is scored or notched as the mechanism to allow the shaft to break off as the rivet is expanded. The manufacture of such a scoring or notch in the shaft is sufficiently imprecise so as to allow the amount of tensile force which is placed on the rivet as it is being expanded to vary somewhat. This may result in rivets in which the shaft breaks off before the rivet is sufficiently enlarged, resulting in substandard rivets. Another problem with rivets of this type is the difficulty in adequately controlling the strength of the weakened part of the shaft, both in torsion as well as the tensile strength. There is a tendency, therefore, of the shaft of such a rivet to twist off prematurely during the drilling phase, particularly where unexpected resistance is encountered in the material being drilled.

It is accordingly the objective of the present invention that it provide a self-drilling "pop" type rivet which overcomes the disadvantages of the art as described above. It is a primary objective of the present invention that it provide a rivet which has an improved mechanism for allowing the breakoff of the shaft such that a more controlled amount of tension may be placed on the rivet to fully expand it before the shaft breaks off. This will result in more uniformly formed rivets which will have superior holding characteristics.

It is also an objective of the present invention to provide a rivet which will be fully sealed, preventing the passage of fluid therethrough. It is an additional objective of the present invention to provide a self-drilling rivet which will remove any burrs which may otherwise prevent the proper seating of the rivet. It is a further objective of the present invention to provide a rivet which is simple of manufacture, to reduce the cost to a level below that of prior self-drilling rivets.

SUMMARY OF THE INVENTION

The disadvantages and limitations of the background art discussed above are overcome by the present invention. With this invention, a self-drilling "pop" type rivet is provided which has only two parts. The first part is a drilling and setting element, which functions to drill the aperture through the two layers of material and to set the rivet once it is properly placed. The second part is a hollow rivet sleeve having a flanged head, which is of rather conventional design. Thus the first part contains features not shown in the art which give the rivet of the present invention particular advantages over prior art rivets.

The drilling and setting element has three segments thereon which vary in diameter. The shaft of the drilling and setting element is of a diameter slightly smaller than the inner diameter of the hollow rivet sleeve. The shaft is of an extended length which extends through the hollow rivet sleeve and out of the hollow rivet sleeve on the end on which the flanged head is located.

Located on the end of the shaft extending from the end of the hollow rivet sleeve opposite the flanged head is a tapered mandrel, with the taper increasing from the diameter of the shaft to a larger diameter. Located on the side of the tapered mandrel having the larger diameter is a larger diameter, generally cylindrical segment having at the end remote from the shaft a drill head. The diameter of this larger diameter cylindrical segment is slightly larger than the outer diameter of the hollow rivet sleeve. The drill head has a plurality of drilling flutes therein to drill a hole for the rivet to be mounted in.

Located on the larger diameter cylindrical segment near the end adjacent the tapered mandrel are several deburring ears, which extend outward from the larger diameter cylindrical segment. The deburring ears function to break away burrs created when the drill head drills through the layers of material the rivet is to be used to join. The deburring ears are thin, and after they break off any remaining burrs, they will be broken off of the large diameter cylindrical segment as it passes through the aperture drilled in the materials to be fastened.

Located on the shaft just above the tapered mandrel are a series of spiral flutes spaced about the circumference of the shaft. The spiral flutes perform the function of allowing the shaft to break away when sufficient tensile force is placed on the shaft, following the expansion of the rivet. The spiral flutes allow the amount of force needed to break away the shaft at the location of the spiral flutes to be relatively consistent from rivet to rivet. They also result in the drilling element having a higher torsional strength than comparable units of the prior art which incorporate a notch to locate the break point of the shaft under tensile load. Consequently the drilling element of the present invention achieves both greater resistance to premature failure under torque while the hole is being drilled and better control of the tensile force is required to sever the shaft in setting the rivet.

The installation of the rivet of the present invention is quick and easy to perform. The drill head drills an aperture through the two layers of material to be fastened together, and the deburring ears break off any burrs which may have formed on the outside surface of the outer layer. The deburring ears are themselves broken off as the drill head penetrates further into the work. Finally, the hollow rivet sleeve extends through the aperture formed by the enlarged drill head, with the flanged rivet head fitting flush on the outside surface of the outer layer due to the absence of burrs thereon.

With the rivet in place, the shaft of the rivet is placed under tension by a suitable tool, drawing the tapered mandrel into the hollow rivet sleeve, expanding the hollow rivet sleeve as the tapered mandrel is drawn into it. The shaft of the rivet continues to draw the tapered mandrel and the larger diameter cylindrical segment into the hollow rivet sleeve, pressing the hollow rivet sleeve against the inside surface of the inner layer of materials. When the hollow rivet sleeve can be expanded no more, the tension on the shaft will cause the shaft to break at the location of the spiral flutes. The drill head is thus swaged into the expanded end of the hollow sleeve, providing a finished rivet which is stronger and more effective in joining a plurality of layers than those prior art rivets where the drill head is dropped away as the rivet is formed. The rivet thus formed generally provides an effective seal to prevent the passage of fluid therethrough.

In accordance with an aspect of the invention, it has been found that the provision of one or more flats or planar segments extending along the side surface of the drill head provides certain beneficial results. One particular embodiment incorporates a pair of 180 degree opposed flats forming small longitudinal faces on opposite sides of the generally cylindrical drill head extending between the tapered portion of the mandrel and the adjacent flutes of the drill portion. In this configuration, the flats serve to reduce the force which is required to pull the mandrel into the sleeve during the swaging process. During swaging, the sleeve assumes the contour of the drill head, thus also developing corresponding flat or planar surfaces over the drill head flats. This serves to increase the frictional engagement of the sleeve to the drill point after installation (setting of the rivet) and also eliminates any possibility of drill point rotation after the rivet is set.

It may therefore be seen that the present invention teaches a self-drilling "pop" type rivet which overcomes the disadvantages of the art as described above. The present invention provides a rivet which has an improved mechanism for controlling the severing of the shaft under a predetermined degree of tension so that the rivet sleeve may be fully expanded before the shaft breaks off. The configuration of spiral flutes used to localize the severance point serves to maintain the strength of the shaft in torsion, thus preventing premature breakoff of the shaft during the hole drilling step.

The present invention also provides a rivet which is fully sealed, preventing the passage of fluid therethrough. Additionally, the rivet of the present invention provides a self-drilling rivet which will remove any burrs which may otherwise prevent the proper seating of the rivet. The rivet of the present invention further is simple to manufacture and has only two parts, thereby minimizing the cost to a level below that of prior self-drilling rivets.

DESCRIPTION OF THE DRAWINGS

A better understanding of the present invention may be realized from a consideration of the following detailed description, taken in conjunction with the accompanying drawings, in which:

FIG. 1 is a cutaway view of the self-drilling rivet of the present invention showing the tapered flutes, showing the rivet beginning to drill through the outer layer of material;

FIG. 2 is a side plan view of the hollow rivet sleeve of the rivet of FIG. 1;

FIG. 3 is a bottom view of the hollow rivet sleeve shown in FIG. 2;

FIG. 4 is a bottom view of the drilling and setting element of the rivet of FIG. 1, showing the location of the drilling flutes and the deburring ears around the circumference of the large diameter cylindrical segment;

FIG. 5 is a cutaway view of the self-drilling rivet of the present invention, showing the larger diameter cylindrical segment entering the drilled aperture, with the deburring ears nearing the outside surface of the outer layer of material;

FIG. 6 is a cutaway view of the self-drilling rivet of the present invention, showing the deburring ears removing a burr and being broken away themselves;

FIG. 7 is a cutaway view of the self-drilling rivet of the present invention, showing the hollow rivet sleeve fitting entirely into the aperture and the flanged rivet head fitting perfectly onto the outside surface of the outer layer of material;

FIG. 8 is a cutaway view of the self-drilling rivet of the present invention, showing the shaft under tension and the tapered mandrel being drawn into the hollow rivet sleeve, expanding the hollow rivet sleeve;

FIG. 9 is a cutaway view of the self-drilling rivet of the present invention, showing the hollow rivet sleeve fully expanded by the tapered mandrel and the shaft broken off at the spiral flutes therein;

FIG. 10 is a bottom view of a second preferred embodiment of the drilling and setting element for use in the rivet of FIG. 1, showing the configuration of the flats along two opposite sides of the element;

FIG. 11 is a side view of the drilling and setting element of FIG. 10; and

FIG. 12 an end view corresponding to FIG. 10 showing the rivet after completion of the swaging step.

DETAILED DESCRIPTION OF THE PREFERRED EMBODIMENTS

One preferred embodiment of the present invention is principally illustrated in FIG. 1, which shows a self-drilling rivet 20 having two parts. The first of these parts, shown in FIGS. 2 and 3 in addition to FIG. 1, is a rivet member 22 comprising a hollow rivet sleeve 24 having an integral outwardly extending flanged rivet head 26 of relatively conventional design. The hollow rivet sleeve 24 and the flanged rivet head 26 of the rivet member 22 are made integrally, typically of a material such as aluminum. The end of the rivet member 22 having the flanged rivet head 26 thereon shall be referred to as the top and the end of the hollow rivet sleeve 24 opposite the flanged rivet head 26 shall be referred to as the bottom.

The second of the parts in the self-drilling rivet 20 is a drilling and setting element 30 typically made of steel and consisting of three segments. The first of these segments is a cylindrical shaft 32 having an outer diameter sufficiently small to fit within the bore of the hollow rivet sleeve 24. The shaft 32 extends from the bottom of the rivet member 22 up through and out the top of the rivet member 22. The portion of the shaft 32 extending out of the top of the rivet member 22 has a series of annular ridges 34 thereon, to enable the shaft 32 to be gripped by a rivet setting implement.

The bottom of the shaft 32, located at the bottom of the hollow rivet sleeve 24, is attached to the second segment of the drilling and setting element 30, which is a tapered mandrel 36. The tapered mandrel 36 varies in diameter from the diameter of the shaft 32 to a larger diameter substantially larger than the inner diameter of the hollow rivet sleeve 24. The smaller diameter portion of the tapered mandrel 36 is connected to the shaft 32, and the larger diameter portion of the tapered mandrel 36 is connected to a larger diameter cylindrical segment 38.

The larger diameter cylindrical segment 38 has on the end opposite its connection to the tapered mandrel 36 a drill head 40, which is pointed and has a plurality of drilling flutes therein. The drill head 40 is slightly larger in diameter than the hollow rivet sleeve 24, and will drill an aperture suitable in size for the hollow rivet sleeve 24 to fit through. The drill head 40 may be any conventional drilling design, and need not be of the precise design illustrated in the drawings. Located on the larger diameter cylindrical segment 38 near the end connected to the tapered mandrel 36 are a plurality of small deburring ears 42.

The deburring ears 42 thus extend radially outward from the outer diameter of the larger diameter cylindrical segment 38 as shown in FIG. 4. The deburring ears 42 are quite thin, and are designed to be broken off after the deburring has been accomplished, as will become evident below. All the components of the drilling and setting element 30 are made in unitary fashion, including the deburring ears 42.

The self-drilling rivet 20 of the present invention does not use conventional scoring or notching to weaken the shaft 32 at the location at which it is to break. Rather, a series of spiral flutes 44 are located around the periphery of the shaft 32 near the location of the attachment of the shaft 32 to the tapered mandrel 36, as shown in FIG. 1. The spiral flutes 44 may be machined or pressed into the surface of the shaft 32, and will represent the portion of the shaft 32 which has the least tensile strength, being reduced in controlled fashion relative to that of the rest of the shaft 32 by the properties of the spiral flutes 44, their number, depth and shape, spacing, length, angle, etc. These parameters can be varied as desired to predetermine the tensile strength of the fluted portion of the shaft and the corresponding minimum torsional strength of the shaft.

Having thus detailed the construction of the rivet member 22, it is now appropriate to discuss the operation by which the self-drilling rivet 20 is installed to join together a first segment of material 46 and a second segment of material 48. Referring first to FIG. 1, the shaft 32 is rotated by a suitable drilling implement (not shown) to turn the drilling and setting element 30 with the drill head 40 brought to bear on the outside surface of the first segment of material 46 where the self-drilling rivet 20 is to be installed. As the drilling and setting element 30 rotates, a burr 50 is cut, remnants of which will remain attached around the hole in the first segment of material 46.

As the drilling and setting element 30 continues to rotate with the drill head 40 bearing against the first segment of material 46 and the second segment of material 48, the drill head 40 will cut through the first segment of material 46 and begin to cut through the second segment of material 48, as shown in FIG. 5. Remnants of the burr 50 will remain attached to the first segment of material 46 as shown. In FIG. 5, the deburring ears 42 are still a short distance away from the outside surface of the first segment of material 46.

Referring next to FIG. 6, the drill head 40 has drilled further into the second segment of material 48, bringing the deburring ears 42 into contact with the outside surface of the first segment of material 46. As the deburring ears 42 contact the outside surface of the first segment of material 46, they will machine away the burr 50, leaving the outside surface of the first segment of material 46 around the aperture drilled smooth and clear. Then, the deburring ears 42 will be broken off of the larger diameter cylindrical segment 38 as shown in FIG. 6.

The drill head 40 will drill through the second segment of material 48 as shown in FIG. 7, and the hollow rivet sleeve 24 of the rivet member 22 will fit through the aperture in the first segment of material 46 and the second segment of material 48. The flanged rivet head 26 will fit cleanly on the outside surface of the first segment of material 46 as shown, since any burrs 50 were removed by the deburring ears 42 (FIG. 6).

With the rivet member 22 installed in the aperture in the first segment of material 46 and the second segment of material 48, the shaft 32 will be pulled upward as shown in FIG. 8 by a suitable rivet setting tool (not shown). As the shaft 32 is pulled upward, the tension will draw the tapered mandrel 36 into the bottom of the hollow rivet sleeve 24, expanding it as shown. A portion of the larger diameter cylindrical segment 38 will also be drawn into the hollow rivet sleeve 24.

As the shaft 32 continues to be pulled upward in tension, the larger diameter cylindrical segment 38 will be drawn to the position shown in FIG. 9, in which the hollow rivet sleeve 24 is pinned between the tapered mandrel 36 and the second segment of material 48. The tapered mandrel 36 will be unable to move further from this position, and thus the tension will increase in the shaft 32. As the tension increases, the shaft 32 will fracture at the location of the spiral flutes 44, and the drilling and setting element 30 will be separated into two segments 30A and 30B.

The smaller remaining portion of the shaft 32 will be well within the hollow rivet sleeve 24, and thus does not protrude beyond the flanged rivet head 26. The tapered mandrel 36 and the larger diameter cylindrical segment 38 will be inside the bottom portion of the hollow rivet sleeve 24 in an interference fit preventing the passage of fluid therebetween. In addition, the hollow rivet sleeve 24 will be tight against the bottom surface of the second segment of material 48, preventing the flow of fluid therebetween. The self-drilling rivet 20 is thus installed in a sealing manner to hold the first segment of material 46 and the second segment of material 48 together.

FIGS. 10, 11 and 12 depict a second preferred embodiment of the present invention which is like the first embodiment depicted in FIGS. 1-9 and in which like reference numerals, [designated by the prime symbol, are used to refer to like parts. Thus, the depicted portion of the drilling and setting element 30' is shown comprising a cylindrical shaft 32' attached to a tapered mandrel 36' which in turn is connected to a generally cylindrical segment 38' terminating in a drill head 40'. As with the first embodiment, deburring ears 42 extend radially outward from the generally cylindrical segment 38'.

The difference from the configuration of the first embodiment is the provision of a pair of opposed flat sides 60 extending longitudinally on opposite sides of the cylindrical segment 38'. It has been found that these flats 60, which each extend approximately 60 degrees about the periphery of the segment 38' and are spaced generally equidistant from the two deburring ears 42 shown in FIGS. 10 and 11, reduce the force which is required to pull the mandrel into the hollow sleeve 24'. As the two members 24' and 38' are swaged together, the sleeve 24' conforms to the shape of the segment 38', thus forming the flats 62 of the sleeve 24' in positions adjacent the corresponding flats 60 of the segment 38'. This serves to stop any possibility of drill point rotation after installation and creates a firm frictional engagement of the sleeve 24' to the drill head 40' after installation.

It may therefore be appreciated from the above detailed description of the preferred embodiment of the present invention that it teaches a self-drilling "pop" type rivet which overcomes the disadvantages of the art as described above. The present invention provides a rivet which has an improved mechanism for allowing the breakoff of the shaft such that a substantial amount of tension may be placed on the rivet to fully expand it before the shaft breaks off. This threshold level of tensile force which is required to sever the shaft is predetermined and controlled uniformly from rivet to rivet by the selected configuration of the flutes 44 which at the same time provides for enhanced torsional strength at the weakened point in the shaft, relative to the mere notching of the shaft. Thus, premature severing of the shaft either during drilling or prior to the rivet being fully expanded is prevented. This results in more uniformly formed rivets which will have superior holding characteristics.

The present invention also provides a rivet which is fully sealed, preventing the passage of fluid therethrough. Additionally, the rivet of the present invention provides a self-drilling rivet which will remove any burrs which may otherwise prevent the proper seating of the rivet. The rivet of the present invention further is simple to manufacture and has only two parts, thereby minimizing the cost to a level below that of prior self-drilling rivets.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. A self-drilling, blind setting rivet, comprising in combination:

a hollow rivet sleeve having a radially outwardly flanged head located at a first end thereof, said hollow rivet sleeve having a second end;

a shaft having a first end and a second end, said first end of said shaft extending through said hollow rivet sleeve and extending out of said hollow rivet sleeve at said first end thereof;

a tapered mandrel tapering from a smaller diameter at a first end to a larger diameter at a second end, said first end of said tapered mandrel being attached to said second end of said shaft, said tapered mandrel cooperating with said hollow rivet sleeve to expand said second end of said hollow rivet sleeve when said shaft draws said tapered mandrel into said second end of said hollow rivet sleeve;

a plurality of spiral flutes located in said shaft adjacent said second end of said shaft, said plurality of spiral flutes providing localized weakening of said shaft for ultimate fracture and severance from said tapered mandrel; and a generally cylindrical segment having a first end attached to said second end of said tapered mandrel, said cylindrical segment having a drill head at a second end thereof.

2. A self-drilling, blind setting rivet as defined in claim 1, wherein said hollow rivet sleeve has an inner diameter which is slightly larger than the outer diameter of said shaft but smaller than the outer diameter of said cylindrical segment.

3. A self-drilling, blind setting rivet as defined in claim 1, wherein said smaller diameter of said tapered mandrel is approximately the same diameter as the outer diameter of said shaft.

4. A self-drilling, blind setting rivet as defined in claim 1, wherein said larger diameter of said tapered mandrel is larger than the inner diameter of said hollow rivet sleeve.

5. A self-drilling, blind setting rivet as defined in claim 1, wherein said plurality of spiral flutes extend radially inwardly of the outer surface of said shaft.

6. A self-drilling, blind setting rivet as defined in claim 2, wherein said plurality of spiral flutes comprise indentations in said shaft terminating at side edges thereof which are flush with the outer diameter of said shaft.

7. A self-drilling, blind setting rivet as defined in claim 1, wherein said shaft, said tapered mandrel, and said cylindrical segment are made integrally of a single piece of material.

8. A self-drilling, blind setting rivet as defined in claim 7, wherein the material used to make said shaft, said tapered mandrel, and said cylindrical segment is steel.

9. A self-drilling, blind setting rivet as defined in claim 8, wherein said hollow rivet sleeve and said radially outwardly extending flange are made of aluminum.

10. A self-drilling, blind setting rivet as defined in claim 1, wherein said generally cylindrical segment includes means for limiting rotation of said segment relative to the hollow sleeve after setting of the rivet.

11. A self-drilling, blind setting rivet as defined in claim 10 wherein said limiting means comprise a pair of opposed flat faces extending longitudinally of said segment from the tapered portion of the mandrel to the drill head.

12. A self-drilling, blind setting rivet as defined in claim 1, additionally comprising means for removing burrs from an aperture drilled by said drill head.

13. A self-drilling blind setting rivet as defined in claim 12, wherein said burr removing means are located on said cylindrical segment.

14. A self-drilling, blind setting rivet as defined in claim 13, wherein said burr removing means comprise a plurality of deburring ears mounted on the outer surface of said cylindrical segment adjacent said first end of said cylindrical segment.

15. A self-drilling, blind setting rivet as defined in claim 14, wherein each of said deburring ears extends radially outwardly from said cylindrical segment.

16. A self-drilling, blind setting rivet as defined in claim 14, wherein said deburring ears are adapted to break off after deburring has been accomplished.

17. A self-drilling, blind setting rivet, comprising in combination: a rivet member having a hollow rivet sleeve with an integral outwardly extending flanged rivet head located at a first end of said hollow rivet sleeve, said hollow rivet sleeve having a second end and being open between said first end and said second end, the interior of said hollow rivet sleeve having a first diameter;

a shaft extending through said hollow rivet sleeve, said shaft having a first end terminating in a gripping portion which extends from said first end of said hollow rivet sleeve, said shaft having a second end adjacent said second end of said hollow rivet sleeve, said shaft having a second diameter;

a tapered mandrel having a first end attached to said second end of said shaft, said tapered mandrel also having a second end remote from said first end of said tapered mandrel, said tapered mandrel having a diameter tapering from said second diameter at said first end of said tapered mandrel to a third diameter at said second end of said tapered mandrel, said tapered mandrel cooperating with said hollow rivet sleeve to expand said second end of said hollow rivet sleeve when said shaft draws said tapered mandrel into said second end of said hollow rivet sleeve;

a plurality of spiral flutes located in said shaft adjacent said second end of said shaft, said plurality of spiral flutes weakening said shaft for ultimate fracture and severance from said tapered mandrel;

a generally cylindrical segment having a first end and a second end, said cylindrical segment having a diameter approximately equal to said third diameter, said first end of said cylindrical segment being mounted to said second end of said tapered mandrel;

a drill head mounted on said second end of said cylindrical segment; and means for removing burrs from an aperture drilled by said drill head, said burr removing means being located on said cylindrical segment.

18. A self-drilling blind setting rivet, comprising:

a hollow rivet sleeve having a radially outwardly flanged head located at a first end thereof, said hollow rivet sleeve having a second end;

a shaft having a first end and a second end, said first end of said shaft extending through said hollow rivet sleeve and extending out of said hollow rivet sleeve at said first end of said hollow rivet sleeve;

a tapered mandrel tapering from a smaller diameter at a first end to a larger diameter at a second end, said first end of said tapered mandrel being attached to said second end of said shaft;

a plurality of spiral flutes located about said shaft adjacent said second end of said shaft for weakening the tensile strength of said shaft to a degree sufficient to localize the fracture point of said shaft when the shaft is placed in tension for severance after setting the rivet while maintaining the torsional strength of said shaft at a level sufficient to avoid fracture while the drill head is being rotated to drill a rivet hole prior to setting the rivet; and a generally cylindrical segment having a first end attached to said second end of said tapered mandrel, said cylindrical segment having a drill head at a second end thereof.

19. A method of making a self-drilling, blind setting rivet, comprising:

providing a hollow rivet sleeve having a radially outwardly flanged head located at a first end thereof, said hollow rivet sleeve having a second end;

installing a shaft having a first end and a second end in said hollow rivet sleeve with said first end of said shaft extending out of said hollow rivet sleeve at said first end of said hollow rivet sleeve;

forming a tapered mandrel having a first end affixed to said second end of said shaft, said tapered mandrel tapering from a smaller diameter at said first end thereof to a larger diameter at a second end thereof, said tapered mandrel cooperating with said hollow rivet sleeve to expand said second end of said hollow rivet sleeve when said shaft draws said tapered mandrel into said second end of said hollow rivet sleeve;

forming a plurality of non-continuous, non-interconnected spiral flutes in said shaft adjacent said second end of said shaft by pressing said flutes into the surface of said shaft to develop a corresponding plurality of depressions therein, said plurality of spiral flutes weakening said shaft for ultimate fracture and severance from said tapered mandrel; and forming a cylindrical segment affixed to said second end of said tapered mandrel, said cylindrical segment having a drill head at a terminal end thereof.

* * * * *